UNITED STATES PATENT OFFICE.

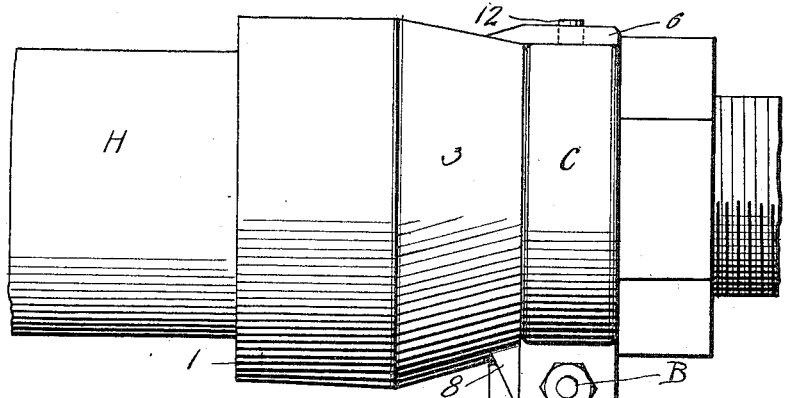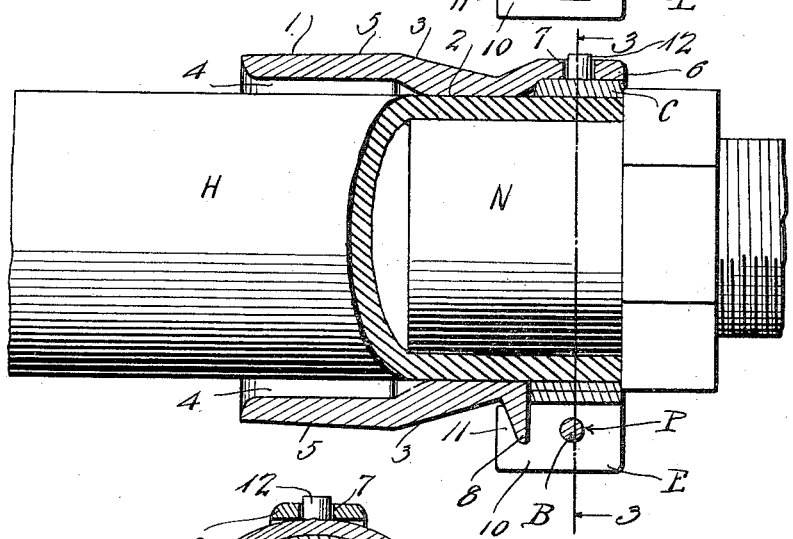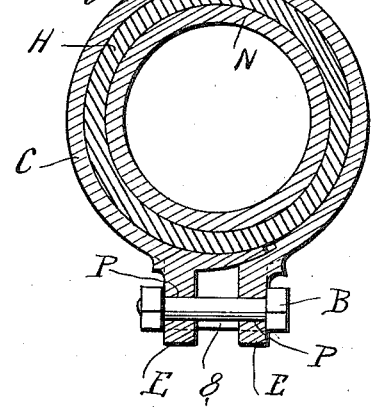

ANDREW R. PEFFERS, OF AURORA, ILLINOIS.

AIR-BRAKE-HOSE PROTECTOR.

1,139,797. Specification of Letters Patent. Patented May 18, 1915.

Application filed June 3, 1912, Serial No. 701,334. Renewed June 7, 1913. Serial No. 772,422.

*To all whom it may concern:*

Be it known that I, ANDREW R. PEFFERS, a citizen of the United States, residing at Aurora, in the county of Kane and State of Illinois, have invented certain new and useful Improvements in Air-Brake-Hose Protectors; and I do declare the following to be a full, clear, and exact description of the invention, such as will enable others skilled in the art to which it appertains to make and use the same.

This invention relates to pipe couplings, and more especially to those used on the air brake hose at the extremities of railway cars; and the object of the same is to produce an improved protector for the hose at this point, and especially at the nipple end of the coupling, which is held upon the hose just back of and by the clamp holding the hose on the coupling proper. This object is accomplished by constructing the protector and clamp in the manner hereinafter more fully described and claimed, and as shown in the drawings wherein—

Figure 1 is a side elevation, Fig. 2 is a central longitudinal sectional view partly in elevation, and Fig. 3 is a cross section on the line 3—3 of Fig. 2.

In the drawings I have conventionally shown the rubber hose H as held upon the nipple N of a hose-pipe coupling by means of a clamp C made in the form of a split ring having outturned ears E at its extremities provided with perforations P through which passes a bolt B for drawing them together and tightening the clamp around the hose and the hose upon the nipple in the manner well understood.

Coming now more particularly to the present invention, the protector is a metal casting made in the shape of a shell whose body 1 is cylindrical on its inner face at its front end 2 where it surrounds the hose H opposite the nipple N of the coupling and is tapered or flared on its outer face, as at 3, so as to avoid an abrupt shoulder and thereby insure against anything more serious than mere glancing blows; and what might be called the rear end or skirt of the shell is enlarged internally as at 4 so as to stand out of contact with the hose and permit it to flex slightly as may be necessary, and also enlarged externally as at 5 so as to preserve the same thickness of the wall of the shell throughout. What might be called the front end of the shell is provided at one side with a longitudinally projecting lug 6 pierced with an eye 7 disposed on a line at right angles to the axis of the protector; and at the other side of this extremity the shell is provided with a radial lip 8.

In attaching this device to the hose a special form of clamp is used, although it will have the perforated ears for the bolt as described above. Said ears in this instance are, however, provided with hooks 10 whose shanks project on lines parallel with the axis of the clamp C and whose bills 11 project radially inward toward said axis; and at a point directly opposite the split in the clamp C its body is provided with a radially projecting pin 12. The clamp, as is well known, is tightened up upon the hose end where it surrounds the nipple N of the coupling, by turning up the nut on the bolt B, and no novelty for the clamp itself is claimed other than as it is constructed so as to coact and coöperate with the protector described above.

In the use of this device, the large end of the shell or body 1 is slipped over the hose first, with the pin 12 of the clamp C in the eye 7, the nut on the bolt B having been adjusted to permit sufficient expansion of the ring C to enable it to follow the body and slide over the end of the hose; and then the nipple N of the coupling is pushed into the end of the hose and through the clamp and into the smaller end of the protector where the latter is made cylindrical so that its inner face 2 closely surrounds the exterior of the hose at this time; and finally the nut on the bolt B is tightened up to draw the two ears E together and tighten the clamp. Thereafter this end of the hose (which in air brake couplings is the free end liable to swing around and hit against various objects or to be struck by other objects) is thoroughly protected from injury, because, just at a point where the rubber or fabric would be cut on the corner of the nipple N if an external object struck it, the shell body 1 of the protector covers the rubber and prevents injury thereto. I enlarge the rear end of this shell as at 4 so that the rubber may flex as is necessary, and I taper the exterior of the front end of the shell, as at 3, so that it will not, in the main, suffer from anything more injurious than merely glancing blows. The specific means of attaching the protector to the clamp I consider also novel and efficient, because the protector cannot become displaced so long as the clamp remains in position. The parts are by preference made of rough metal castings, suitably treated to prevent rust; but the exact sizes, shapes, proportions and materials are unimportant.

When the protector and ring are removed together from the hose, the two may then be separated, it will be observed, without flexing the ring. In other words, a downward movement of the ring will disengage the pin 12 from the hole 7 and will disengage the hooks 11 from the lip 8 at the bottom.

What is claimed as new is:—

1. In a protector for air brake hose and the like, the combination with a tubular shell adapted to surround the hose and having at one end a longitudinally projecting lug pierced with an eye and diametrically opposite thereto a radially projecting lip; of a nipple adapted to be positioned within the extremity of the hose, a collar consisting of a split ring adapted to surround the hose outside said nipple and having radial ears at its ends, hooks projecting from said ears and having their bills engaging the lip on the protector, and a pin projecting radially from the clamp and engaging the eye in the lug on said shell.

2. In a protector for air brake hose and the like, the combination with a tubular shell adapted to surround a hose and having at one end a longitudinally projecting lug pierced with an eye; of a nipple adapted to be positioned within the extremity of the hose, a clamp consisting of a split ring adapted to surround the hose outside the nipple and having radial ears at its ends, means for drawing said ears together, means for connecting said ears with the shell, and a pin projecting radially from the ring and engaging the eye in said lug.

3. An air brake connection comprising a nipple, a hose pipe engaging over said nipple, a clamping ring directly engaging said hose pipe for holding the hose pipe on said nipple, and a non-flexible protector rigidly held in place by said ring, but separable therefrom, said protector and ring having rigid interlocking portions whereby the two are held in proper relation to each other, but with a sliding connection between them, permitting contraction of said ring without tending to distort said protector.

4. An air brake connection comprising a nipple, a hose pipe engaging over said nipple, a clamping ring directly engaging said hose pipe, for holding the hose pipe on said nipple, and a non-flexible protector rigidly held in place by said ring, but separable therefrom without flexing said ring when removed from said nipple and pipe, having an interlocking connection with opposite sides thereof, the said connection depending on the hose pipe to hold the protector and ring together.

5. An air brake connection comprising a nipple, a hose pipe engaging over said nipple, a clamping ring directly engaging said hose pipe, for holding the hose pipe on said nipple, and a non-flexible protector rigidly held in place by said ring, but separable therefrom, having a sliding connection therewith, said ring being thereby adjustable without tending to distort said protector.

6. An air brake connection comprising a nipple, a hose pipe engaging over said nipple, a clamping ring directly engaging said hose pipe, for holding the hose pipe on said nipple, and a non-flexible protector rigidly held in place by said ring, but separable therefrom, the said protector having relatively large and small ends, and being tapered toward the said ring, to provide a solid impact-deflecting shoulder, which ring is of less diameter than the larger end of the protector, the ring and protector having annular engagement at their abutting ends.

7. An air brake connection comprising a nipple, a hose pipe engaging over said nipple, a clamping ring directly engaging said hose pipe, for holding the hose pipe on said nipple, and a non-flexible one piece protector rigidly held in place by said ring, but separable therefrom without flexing said ring when removed from said nipple and pipe, said protector being formed internally with space extending entirely around the hose pipe to prevent jamming of the hose pipe against the end of said nipple, and externally with a sloping impact-deflecting shoulder between said space and ring, the protector having one end portion thereof gradually tapered toward the ring to provide said shoulder.

8. An air brake connection comprising a nipple, a hose pipe engaging over said nipple, a clamping ring directly engaging said hose pipe, for holding the hose pipe on said nipple, and a non-flexible protector rigidly held in place by said ring, but separable therefrom without flexing said ring when removed from said nipple and pipe, the said protector having one end portion formed to provide space between its inner surface and said hose pipe, said space extending from a point back of the end of the nipple to the outer edge of the protector, and the other end portion of the protector being externally and gradually tapered toward said ring, to provide a circumferential bevel forming a solid impact-deflecting shoulder, and whereby the one end of the protector is of greater diameter than the other end thereof, as and for the purpose set forth.

9. An air brake connection comprising a nipple, a hose pipe engaging over said nipple, a clamping ring for holding the hose pipe on said nipple, and a protector rigidly held in place by said ring, but separable therefrom without flexing said ring when removed from said nipple and pipe, said protector being entirely of solid non-flexible metal, formed with an enlarged end portion of greater diameter than said ring, thereby providing a space between the hose pipe and the inner surface of the protector, at the end of the nipple, and also a sloping impact-deflecting shoulder for the outside thereof, formed by the gradually tapered end portion of the protector, said ring and protector being separable without distortion of any portion thereof.

10. An air brake connection comprising a nipple, a hose pipe engaging over said nipple, a clamping ring for holding the hose pipe on said nipple, and a protector rigidly held in place by said ring, but separable therefrom, said protector being entirely of solid non-flexible metal, formed with an enlarged end portion of greater diameter than said ring, thereby providing a space between the hose pipe and the inner surface of the protector, at the end of the nipple, and also a sloping impact-deflecting shoulder for the outside thereof, said ring and protector being separable without distortion of any portion of said protector, and said ring and protector having annular contact with each other circumferentially of said hose pipe.

11. An air brake connection comprising a nipple, a hose pipe engaging over said nipple, a clamping ring for holding the hose pipe on said nipple, and a protector rigidly held in place by said ring, but separable therefrom, said protector being entirely of solid non-flexible metal, formed with an enlarged end portion of greater diameter than said ring, thereby providing a space between the hose pipe and the inner surface of the protector, at the end of the nipple, and also a sloping impact-deflecting shoulder for the outside thereof, said ring and protector being separable without distortion of any portion of said protector, and said ring being flexible, having portions which slide on the protector when the ring is operated.

In testimony whereof I have hereunto set my hand in presence of two subscribing witnesses.

ANDREW R. PEFFERS.

Witnesses:
D. J. PEFFERS,
JOHN BOUTTER.

Copies of this patent may be obtained for five cents each, by addressing the "Commissioner of Patents, Washington, D. C."